(12) United States Patent
Hsu et al.

(10) Patent No.: US 10,027,870 B2
(45) Date of Patent: Jul. 17, 2018

(54) INTEGRATED SUBSTRATE FOR ANTI-SHAKE APPARATUS

(71) Applicant: TDK Taiwan Corp., Nangang District, Taipei (TW)

(72) Inventors: Chih Chien Hsu, Taoyuan County (TW); Choa Chang Hu, Taoyuan County (TW); Wen Chang Lin, Taoyuan County (TW)

(73) Assignee: TDK Taiwan Corp., Taipei (TW)

( * ) Notice: Subject to any disclaimer, the term of this patent is extended or adjusted under 35 U.S.C. 154(b) by 0 days.

(21) Appl. No.: 15/603,881

(22) Filed: May 24, 2017

(65) Prior Publication Data

US 2017/0257544 A1    Sep. 7, 2017

Related U.S. Application Data

(63) Continuation of application No. 14/670,153, filed on Mar. 26, 2015, now Pat. No. 9,681,034, which is a continuation of application No. 13/750,110, filed on Jan. 25, 2013, now Pat. No. 9,013,586.

(51) Int. Cl.
*H04N 5/225* (2006.01)
*H04N 5/232* (2006.01)
*G02B 27/64* (2006.01)

(52) U.S. Cl.
CPC ......... *H04N 5/2257* (2013.01); *G02B 27/646* (2013.01); *H04N 5/2253* (2013.01); *H04N 5/2254* (2013.01); *H04N 5/2328* (2013.01); *H04N 5/23287* (2013.01)

(58) Field of Classification Search
CPC .. H04N 5/2257; H04N 5/2253; H04N 5/2328; H04N 5/23287; H04N 5/2254; G02B 27/646
See application file for complete search history.

(56) References Cited

U.S. PATENT DOCUMENTS

| | | | |
|---|---|---|---|
| 2007/0241273 A1* | 10/2007 | Kim | H01L 27/14625 250/239 |
| 2010/0104270 A1* | 4/2010 | Huang | G03B 17/00 396/55 |
| 2011/0096178 A1* | 4/2011 | Ryu | H04N 5/2252 348/208.2 |
| 2012/0182436 A1* | 7/2012 | Hu | H04N 5/2254 348/208.99 |

* cited by examiner

*Primary Examiner* — Mekonnen Dagnew

(57) ABSTRACT

An integrated substrate for an anti-shake apparatus defined with an optical axis includes: a substrate, a lens module, an anti-shake apparatus and an image-sensing module. The substrate includes a frame having a predetermined thickness. The frame includes a first surface, a second surface, a first circuit layout, and a second circuit layout. The lens module is located above the substrate on the optical axis. The anti-shake apparatus is furnished between the lens module and the substrate. The image-sensing module has an active side and an inactive side, and the inactive side is furnished onto the second surface. The active side is located on the optical axis in a manner of facing the lens module. The anti-shake apparatus is coupled to the first circuit layout, while the image-sensing module is coupled to the second circuit layout. The first and second circuit layouts comprise a plurality of first and second metal leads, respectively.

11 Claims, 9 Drawing Sheets

US 10,027,870 B2

INTEGRATED SUBSTRATE FOR ANTI-SHAKE APPARATUS

This application claims the benefit of Taiwan Patent Application Serial No. 101136402, filed Oct. 2, 2012, the subject matter of which is incorporated herein by reference.

BACKGROUND OF INVENTION

1. Field of the Invention

The invention relates to an integrated substrate structure for anti-shake apparatuses, and more particularly to the substrate structure that can integrate an image-sensing module and an anti-shake apparatus into a single piece, in which the substrate provides two different circuit layouts to energize individually the image-sensing module and the anti-shake apparatus; such that the manufacturing cost can be reduced by using less elements, the production yield can be promoted, and the miniaturization in products can be made possible.

2. Description of the Prior Art

As the technology prospers, more and more versatile electronic products for information can be seen in the marketplace. One of significant trends for mainstream electronic products is provide a product that is miniaturized in volume but able to provide various entertainment purposes, more human amicable, and better to meet consumers' fashion needs. For example, in mobile phones, the product that can integrate a digital camera device, a notebook computer or a MP3, or can forms as a PAD having a digital-camera function is one of the hot topics in this industry. Apparently, common features for almost all these improvements are to achieve goals in minimization, easy-assembling, and simplified manufacturing processes.

Referring now to FIG. 1, a conventional anti-shake image-sensing structure 1 is shown in a cross-sectional view to have an image-sensing module 11, a substrate 12, a carrier base 13, 1 lens module 14, an anti-shake mechanism 15, a circuit board and a plurality of metal wires 17, in which the image-sensing module 11 is located on the substrate 12 and is electrically connected via the metal wires 17, and the carrier base 13 is to house thereupon so as to protect the electric connection by the metal wires 17 between the image-sensing module 11 and the substrate 12. The anti-shake mechanism 15 is located on the circuit board 16 and under the lens module 14, in which the circuit board is mounted on the carrier base 13. The lens module 14 is fixed to the circuit board 16 via the anti-shake mechanism 15. The circuit board 16 further has a central hole 161 located correspondingly thereupon to the central portion of the lens module 14 and thereunder a penetration hole 131 of the carrier base 13 above the image-sensing module 11. Upon such an arrangement, the optical path for capturing the image of a foreign object from a chip on the image-sensing module 11 to the foreign object outside the lens module 14 is to go through the penetration hole 131 of the carrier base 13, the central hole 161 of the circuit board 16, a lens unit 141 preset in the central of the lens module 14.

However, in the conventional anti-shake image-sensing structure 1 described above, the image-sensing module 11 and the anti-shake mechanism 15 are located separately to the substrate 12 and the circuit board 16. The circuit board 16 is further mounted to the insulated carrier base 13 so as to top on the image-sensing module 11 and thereby to relate the lens module 14 and the image-sensing module 11. Upon such an arrangement, the minimization for this conventional structure 1 is hard to achieve for a high possibility of a tilt spacing exists between the image-sensing module 11 and the circuit board 16, which would lead to a bias in the image optical paths and make cumbersome in assembling the structure 1.

SUMMARY OF THE INVENTION

Accordingly, it is the primary object of the present invention to provide an integrated substrate for an anti-shake apparatus, in which two different circuit layouts are provided by the same substrate to respectively energize an image-sensing module and an anti-shake apparatus, such that advantages in less elements, less assembly tolerance and a minimized size in thickness can be obtained.

In the present invention, the integrated substrate for an anti-shake apparatus defined with an image-capturing optical axis includes a substrate, a lens module, an anti-shake apparatus and an image-sensing module. The substrate further includes a frame with a predetermined thickness, in which the frame has a first surface, a second surface, a first circuit layout and a second circuit layout. The first circuit layout and the second circuit layout are formed by a plurality of first metal leads and a plurality of second metal leads, respectively.

The lens module is located on the image-capturing axis above the substrate. The anti-shake apparatus is located between the lens module and the substrate. The lens module is suspended above the substrate by the anti-shake apparatus. The image-sensing module further has an active side and an inactive side, in which the inactive side is located on the substrate while the active side is located on the optical axis at a position corresponding to the lens module. The anti-shake apparatus is electrically connected with the substrate through the first circuit layout, while the image-sensing module is electrically connected with the substrate through the second circuit layout.

All these objects are achieved by the integrated substrate for an anti-shake apparatus described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an integrated substrate for an anti-shake apparatus. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
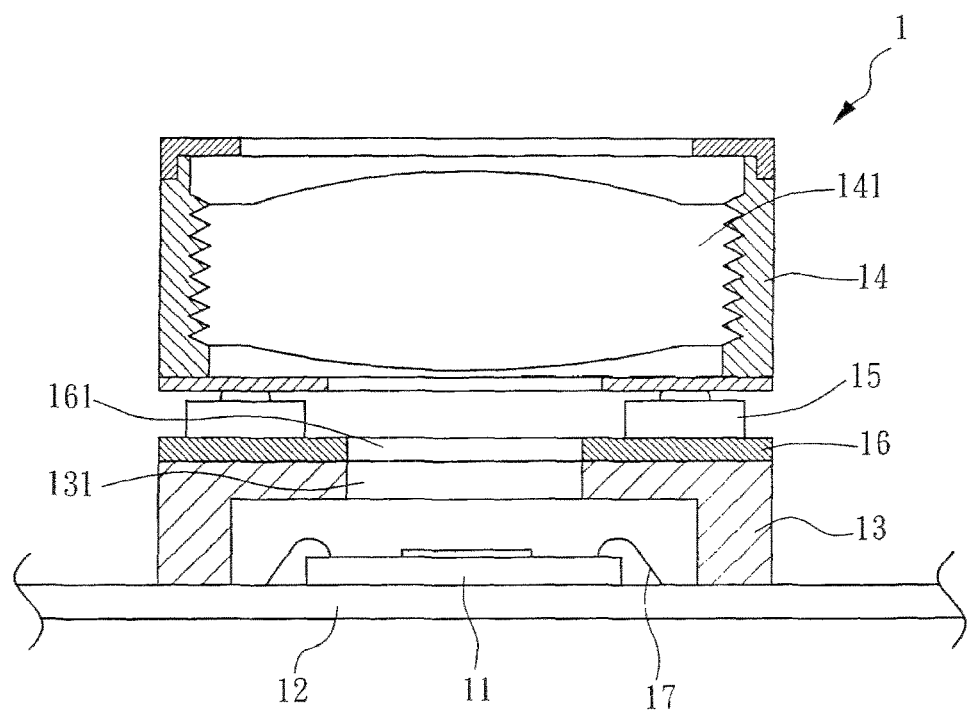
FIG. 1 is a schematic cross-sectional view of a conventional anti-shake image-sensing structure in the art.
Figure 2:
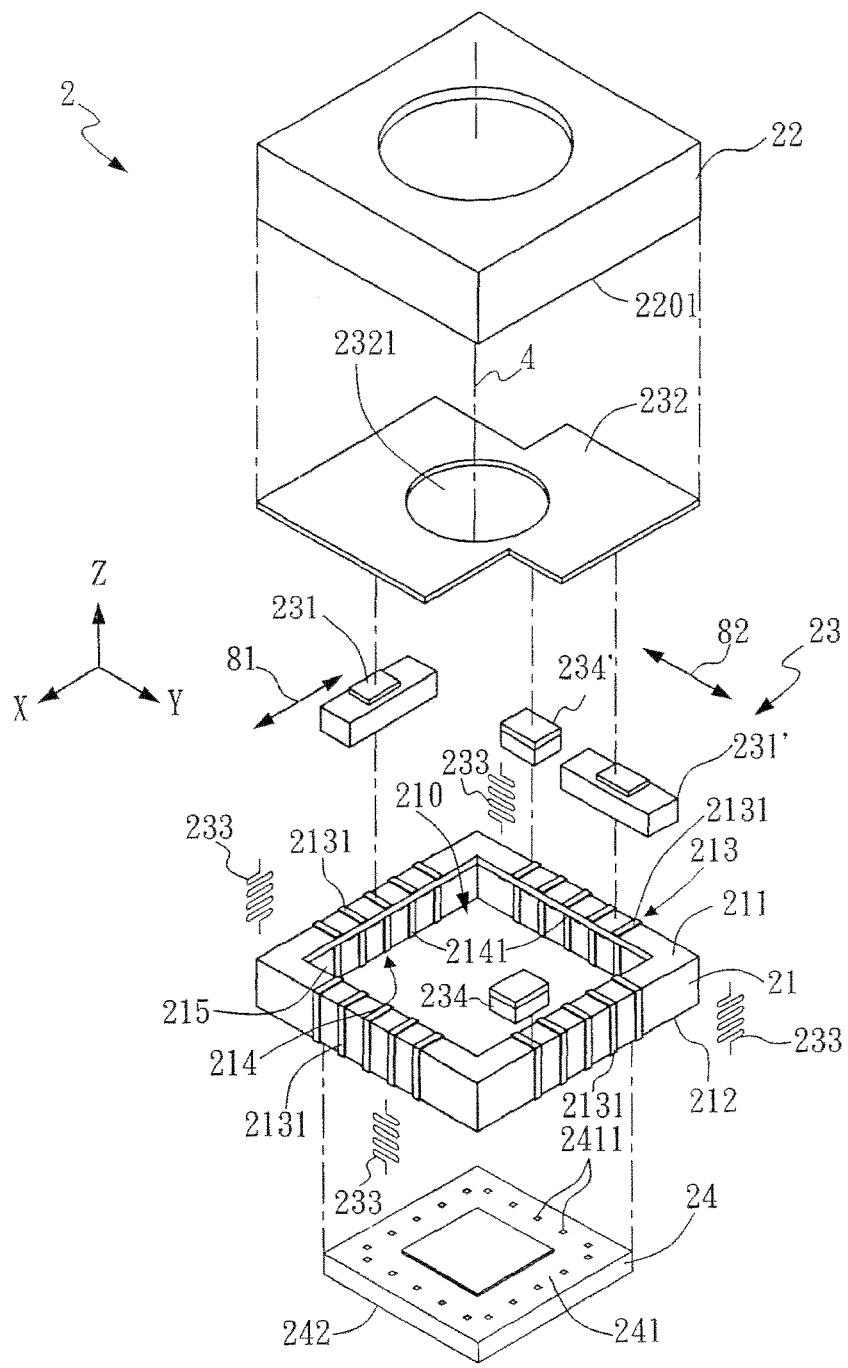
FIG. 2 is a schematic exposed view of a first embodiment of the integrated substrate for an anti-shake apparatus in accordance with the present invention.
Figure 3:
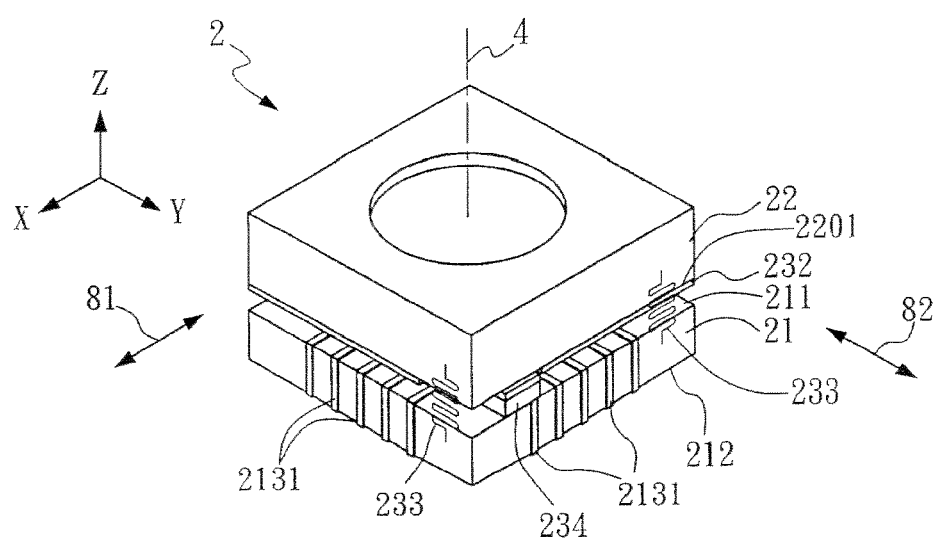
FIG. 3 is a perspective view of FIG. 2.
Figure 4:
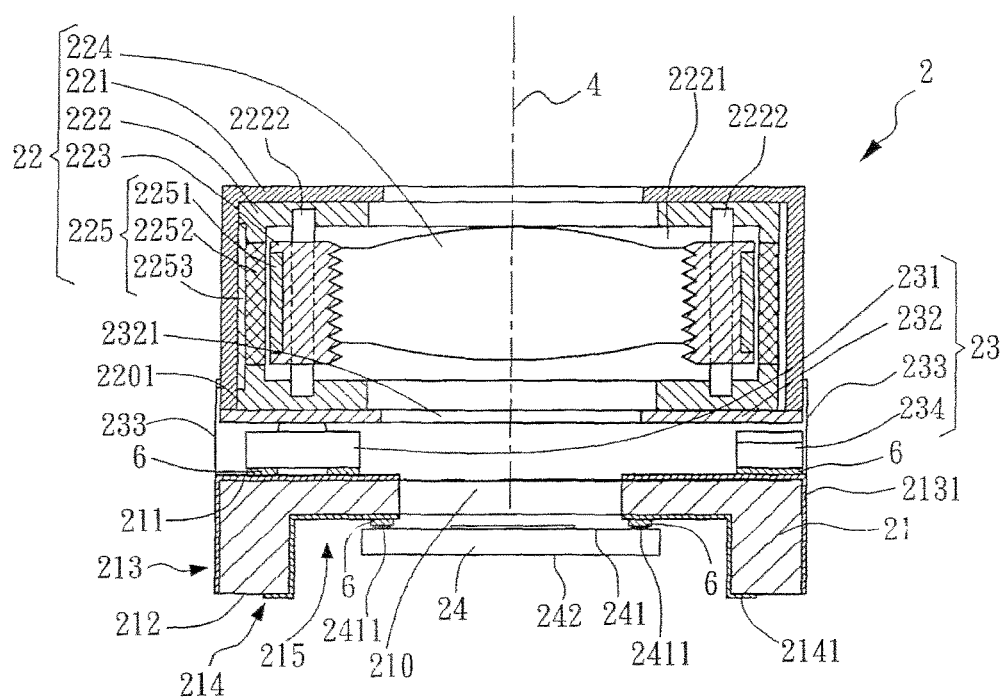
FIG. 4 is a cross-sectional view of FIG. 3.

Referring now to FIG. 2, FIG. 3 and FIG. 4, a first embodiment of the integrated substrate for an anti-shake apparatus in accordance with the present invention is shown in an exploded view, an assembled perspective view and a cross-sectional view, respectively.

In this first embodiment, the integrated substrate 2 for an anti-shake apparatus includes a substrate 21, a lens module 22, an anti-shake apparatus 23 and an image-sensing module 24. The substrate 21 formed as a frame with a predetermined thickness further includes a first surface 211, a second surface 212, a first circuit layout 213 and a second circuit layout 214. Preferably, the substrate 21 can be formed by laminating a plurality of integrated circuit layers, in which each of the integrated circuit layers is furnished with a circuit layout. Among the integrated circuit layers, plural conductive pillars or vias can be applied to establish electric inter-layer connection. Upon such an arrangement, the first circuit layout 213 on the first surface 211 and the second circuit layout 214 on the second surface 212 can be electrically coupled. The image-sensing module 24 further includes an active side 241 and an inactive side 242. Between the lens module 22 and the image-sensing module 24, an optical axis 4 is defined to demonstrate the optical path of imaging a foreign object on the image-sensing module 24.

In this first embodiment, a penetration hole 210 for providing the optical axis 4 to penetrate through the lens module 22 and the image-sensing module 24 is located at the central portion of the substrate 21. On the second surface 212 of the substrate 21, a concave-down step structure 215 is formed in the middle portion of the second surface 212. The first circuit layout 213 located on the first surface 211 of the substrate 21 is to facilitate electric communications among multiple contact points on the anti-shake apparatus 23. The second circuit layout 214 located on the step structure 215 of the second surface 212 of the substrate 21 is to facilitate electric communications among another multiple contact points on the image-sensing module 24. In the present invention, the substrate 21 can be one of the glass substrate, a ceramic substrate and a printed circuit board.

In this embodiment, the first circuit layout 213 and the second circuit layout 214 include a plurality of first metal leads 2131 and a plurality of second metal leads 2141, respectively. Each of the first and the second metal leads 2131, 2141 is formed as a planar strip preferably carved into the respective surface in a radial out-extending and even distributed manner on the corresponding first or second surface 211, 212. In particular, the first metal lead 2131 is extended from the lateral side of the substrate 21 to carve at the first surface 211 (the top surface) of the substrate 21, in which the end thereof on the first surface 211 is there for electric connection with respective contact point on the anti-shake apparatus, while another end of the first metal lead 2131 is located at the lateral side of the substrate 21 for electric connection with a control circuitry that is predetermined to control the anti-shake apparatus 23.

In addition, the second metal lead 2141 of the second circuit layout 214 is extended from the second surface 212 to the inside of the step structure 215 of the second surface 212. One end of the second metal lead 2141 is carved into the step structure 215 for establishing electric connection with the image-sensing module 24 (or the image sensor chip), while another end thereof is located on the second surface 212 as a contact point for another electric connection with other electronic or electric elements. In the present invention, the metal lead, either the first metal lead 2131 or the second metal lead 2141, can be produced from a stamping process or an etching process upon a metal sheet, and the metal material can be one of the copper, aluminum, alloy, and any appropriate metal material.

In the present invention, the substrate 21 can further include thereinside a passive element, a drive IC and a circuit for driving a gyroscope, in which all the aforesaid elements inside the substrate 21 can establish electric connections with foreign devices via the first and/or the second circuit layouts 213, 214. Particularly, the preferred positions for the output terminals of the substrate 21 are at the extension ends of the first and the second metal leads 2131, 2141 of the corresponding first and the corresponding second circuit layouts 213, 214, in which the extension ends are located at the lateral side (in the thickness direction) and/or the second surface 212 (the bottom side) of the substrate 21. Similarly, the circuitries inside the substrate 21 (including the passive element, the drive IC and the circuit for driving a gyroscope) can also utilize the aforesaid extension ends to be the contact points for electrically outputting. For example, in the case that the electric output terminals for the substrate 21 are mainly chosen to be at the second surface 212 (the bottom surface) of the substrate 21, the first metal lead 2131 can be further extended from the lateral side to the to second surface 212 of the substrate 21, the same as which the second metal lead 2141 locates. Upon such an arrangement, the second surface 212 can provide simultaneously output terminals of the first circuit layout 213 and the second circuit layout 214 for external electrical contact purposes.

Figure 5:
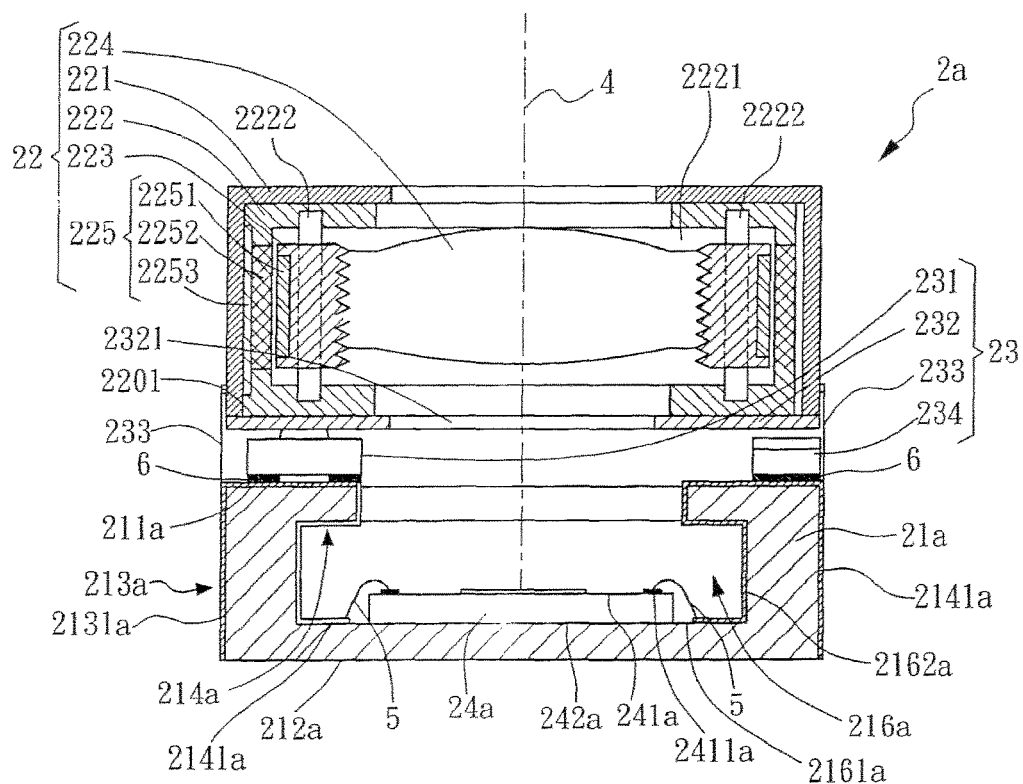
FIG. 5 is a schematic cross-sectional view of a second embodiment of the integrated substrate for an anti-shake apparatus in accordance with the present invention.

In the present invention, the lens module 22 can include a plurality of lenses (either zooming lenses or focus lenses, or both). In this embodiment, the lens module 22 is preferred to be a zooming lens module or a focus lens module which is driven by an electromagnetic drive device formed by coils and magnets. As shown in this embodiment, the lens module 22 further includes a casing 221, a base frame 222, a carrier 223, a lens 224 and an electromagnetic drive module 225. The lens 224 is mounted in a central portion of the carrier 223, and thus displaces synchronically with the carrier 223. The carrier 223 located in an accommodation space 2221 inside the base frame 222. A guide mechanism 2222 also inside the base frame 222 is introduced to regulate the carrier 223 to precede an axial motion along the image-capturing optical axis 4 inside the accommodation space 2221. In another embodiment as shown in FIG. 5, the guide mechanism 2222 can be a drive motor of spring plate type, which the spring plates are electrically connected to the first circuit layout 213 or the second circuit layout 214 of the substrate 21 via the spring member 233.

The electromagnetic drive module 225 further includes a magnetic member 2251, a coil 2252 and a circuit board 2253. The magnetic member 2251 is located at the carrier 223 at a position corresponding to the coil 2252 located at the base frame 222. The circuit board 2253 is attached exteriorly to the base frame 222, and also between the casing 221 and the base frame 222. The circuit board 2253 is connected electrically to the first circuit layout 213 or the second circuit layout 214 of the substrate 21 via the spring member 233.

Preferably, the embodiment shall have two pairs of the magnetic members 2251 and the corresponding coils 2252.

The magnetic member 2251 can be a permanent magnet. In operations, the circuit board 2253 applies specific currents to the coil 2252 so as to form a corresponding magnetic field with a desired direction. The magnetic member 2251 is then moved by the magnetic field so as to drive synchronically the carrier 223 along the image-capturing optical axis 4 inside the accommodation space 2221. As the direction of the applied currents changes, the direction of the induced magnetic field is also reversed. Upon such an arrangement, accounting to the changes in applied currents to the coils 2252, the carrier 223 as well as the lens 224 can be moved back and forth inside the accommodation space 2221 so as to serve a corresponding zooming or focusing order.

The image-sensing module used to capture foreign images can be a device having a charge coupled device (CCD) or a complementary metal oxide semiconductor (CMOS). By providing the lens module 22 to transfer, along the image-capturing optical axis 4, an image of a foreign object to form a corresponding photo image on the imaging unit (CCD or CMOS) of the image-sensing module 24, the photo image is then transformed into a corresponding digital photo image data readable to a computer, a digital camera or a digital recorder, by the image-sensing module 24. However, techniques for the lens module 22 and the image-sensing module 24 are already matured in the art, and thus details thereabout are omitted herein.

In the present embodiment, the anti-shake apparatus 23 of the present invention is located in a center portion between the lens module 22 and the substrate 21. Thereby, the lens module 22 can suspend over the corresponding image-sensing module 24 via the anti-shake apparatus 23. With the anti-shake apparatus 23 to suspend the lens module 22 over the image-sensing module 24 along the image-capturing optical axis 4, the lens module 22 can be quickly shifted back to a preferable position on the image-capturing optical axis 4 by having the anti-shake apparatus 23 to compensate the biased displacement, while meeting a foreign or unexpected forcing to stray off the image-capturing optical axis 4.

The anti-shake apparatus 23 includes at least one piezoelectric member 231, 231', a friction plate 232, a plurality of spring members 233 and at least one position-detecting module 234, 234'. A first axial direction 81 and a second axial direction 82 perpendicular to the first axial direction are defined on the first surface 211 of the substrate 21; i.e. the surface perpendicular to the image-capturing optical axis 4. Two pairs of the piezoelectric members 231, 231' are set on the first surface 211 of the substrate 21 by aligning individually with the first axial direction 81 and the second axial direction 82. The piezoelectric members 231, 231' are both connected electrically to the first metal lead 2131 of the first circuit layout 213 via appropriate electric-conductive materials 6. Namely, the two pairs of the piezoelectric members 231, 231' form a planar 90-degree arrangement on the substrate 21, and further top surfaces of the two pairs of the piezoelectric members 231, 231' are depressed onto the friction plate 232, in which the friction plate 232 is located on a bottom surface 2201 of the lens module 22. Upon such an arrangement, via the friction plate 232, the two pairs of the piezoelectric members 231, 231' can then drive the lens module 22 to displace along the first axial direction 81 and the second axial direction 82. In the present invention, the electric conductive material 6 can be any one of conductive glue, a solder, a wielding pad and a solder ball.

In the present invention, the first axial direction 81 and the second axial direction 82 stand respectively for the X-axis and the Y-axis of a 3D orthogonal coordinate system to span, as a Z=0 plane, the first surface 211 of the substrate 21. Obviously, the image-capturing optical axis 4, perpendicular to both the first axial direction 81 and the second axial direction 82 are the Z-axis of the same coordinate system. In the embodiment of the present invention, the two pairs of the piezoelectric members 231, 231' for compensating the displacement biases of the lens module 22, with respect to the substrate 21, at the first axial direction 81 and the second axial direction 82 can be embodied as piezoelectric motors with a preferred working frequency of 120 KHz or any if better.

In the present embodiment, when the piezoelectric member 231 is applied by a voltage, the corresponding piezoelectric motor would drive the lens module 22 to move linearly along the first axial direction 81 (X-direction). Similarly, when the piezoelectric member 231' is applied by another voltage, the corresponding piezoelectric motor would drive the lens module 22 to move linearly along the second axial direction 82 (Y-direction). Thus, the lens module 22 can be arbitrarily adjusted on the surface spanned by the X-axis and the Y-axis and perpendicular to the image-capturing optical axis 4 (Z-axis).

As shown, two position-detecting modules 234, 234' are provided individually to respective predetermined positions at two lateral sides of the first surface 211 of the substrate 21. In the present invention, the position-detecting module 234, 234' can be a magneto-resistive sensor such as a Hall effect sensor. The position-detecting modules 234, 234' are connected to the first metal leads 2131 of the first circuit layout 213 via the electric conductive materials 6. The position-detecting modules 234, 234' can compute the displacement biases of the lens module 22 away from the image-capturing optical axis 4; i.e. the distances from zeros of the X-axis (along the first axial direction 81) and the Y-axis (along the second axial direction 82). The displacement biases are then compensated by actuating relevantly the piezoelectric members 231, 231' who push the lens module 22 via the friction plate 232, so as to adjust the connection line of the lens module 22 and the image-sensing module 24 to coincide with the image-capturing optical axis 4.

The friction plate 232 is mounted to the bottom surface 2201 of the lens module 22 at a position respective to the first surface 211 of the substrate 21, and the friction plate 232 is sit onto the piezoelectric members 231, 231' so as to enhance the friction between the lens module 22 and the piezoelectric members 231, 231'. A penetration hole 2321 for allowing the image-capturing optical axis 4 to pass is located at the central portion of the friction plate 232.

In this embodiment, each of the spring members 233 is formed as a slender sinusoidal winding metal plate, or a lengthwise spiral metal spring. Four sets of the spring members 233 are furnished to four equal-spaced corners of lateral sides of the substrate 21. By having one end of each the spring member 233 to be fixed to the substrate 21 while another end thereof to be fixed to the lens module 22, the lens module 22 can be then suspended in a spring manner over the first surface 211 of the substrate 21. Namely, by providing a plurality of the spring members 233 to surround and fix the substrate 21 and also by having the lens module 22 to be elastically fixed over the substrate 21 in a parallel manner (i.e. perpendicular to the image-capturing optical axis 4), the lens module 22 can then hold (without dropping off in any direction) the connection with the substrate 21 upon meeting an unexpected impact or shake, and also a preset pulling force can exist between the lens module 22 and the substrate 21. Thereby, the pulling force can keep all-time contact between the friction plate 232 under the lens module 22 and the piezoelectric members 231, 231' on the substrate 21, such that a substantial friction forcing can be always there in between to make possible the piezoelectric members 231, 231' horizontally moving the lens module 22.

In the first embodiment of the present invention, the active side 241 of the image-sensing module 24 can be produced onto the concave step structure 215 of the second surface 212 of the substrate 21 by a flip-chip technique, and also the flip-chipping can overlap the penetration hole 210. Upon such an arrangement, the active side 241 of the image-sensing module 24 can be in a position respective to the lens module 22 on the image-capture photo axis 4. Also, a plurality of conductive ends 2411 at the outer rim of the active side 241 are electrically coupled with the second circuit layout 214 at the concave step structure 215.

Namely, while the elevation difference at the concave step structure 215 exists over to the second surface 212, applying the flip-chip technique on the second surface 212 can embed the active side 241 of the image-sensing chip 24 onto the step structure 215, and can also connect electrically the conductive ends 2411 surrounding the active side 241 of the image-sensing chip 24 to the second metal leads 2141 of the second circuit layout 214 on the step structure 215 via the conductive materials 6; such that risk of bridging shortcuts can be reduced.

In following descriptions upon some more embodiments in accordance with the present invention, for most of the elements in these embodiments are resembled to or at least similar to the corresponding elements in the aforesaid embodiment, details for the same elements and the same structures are omitted herein. Further, any element in any following embodiment would be given the same name and number as the element in the aforesaid embodiment if their structures and serving purposes are the same. Any element in any following embodiment would be given the same name but a number with a tailing letter as the similar element in the aforesaid embodiment if their structures and serving purposes are similar.

Figure 6:
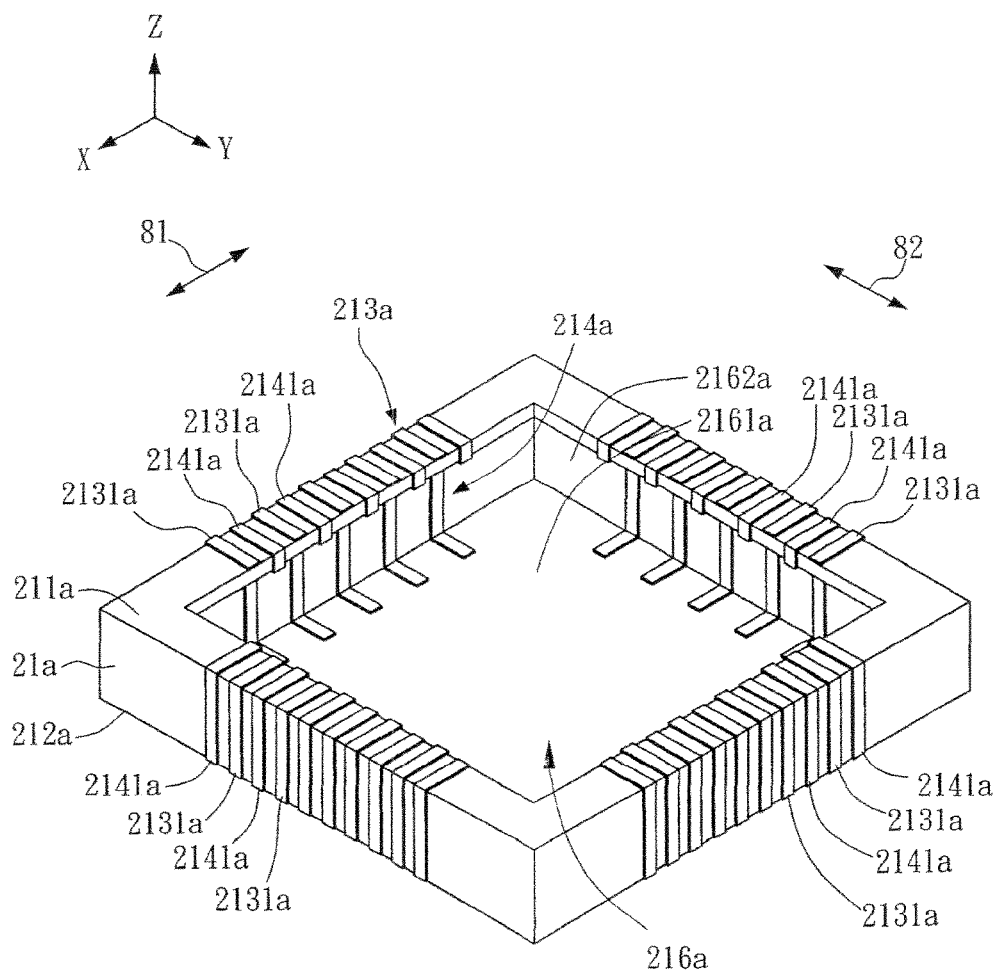
FIG. 6 is a perspective view of FIG. 5.

Referring now to FIG. 5 and FIG. 6, a cross-sectional view and a perspective view of a second embodiment of the integrated substrate for an anti-shake apparatus in accordance with the present invention is shown, respectively. Compared to the embodiment shown in FIG. 2, the major difference between this second embodiment and the previous first embodiment is that the integrated substrate 2a of this embodiment includes an interior groove 216 is formed in the central empty of the substrate 21a; i.e. at the midway between the first surface 211a and the second surface 212a. The first circuit layout 213a is extended from the first surface 211a to the lateral surface of the substrate 21a. In the lateral surface, the first circuit layout 213a protrudes a plurality of the first metal leads 2131a for electrically connection to the contact points on the piezoelectric member 231'.

One ends of the second metal leads 2141a of the second circuit layout 214a are extended to a groove bottom surface 2161a of the interior groove 216 of the substrate 21a, while another ends of the second metal leads 2141a are extending through a groove vertical wall 2162a and the first surface 211a and are finally bent to be embedded on the lateral surface of the substrate 21a. The inactive side 242a of the image-sensing module 24a is attached to be mounted on the groove bottom surface 2161a of the interior groove 216a at a specific region that to does not appear any portion of the second circuit layout 214a. On the other hand, the active side 241a of the image-sensing module 24a faces upward to the lens module 22 on the image-capturing optical axis 4. Plural conductive ends 2411a on the active side 241a of the image-sensing module 24a are electrically bridged individually by corresponding metal wires 5 to the respective second metal leads 2141a embedded on the groove bottom surface 2161a.

As shown in FIG. 6, the first metal leads 2131a of the first circuit layout 213a on the substrate 21a and the second metal leads 2141a of the second circuit layout 214a inside the interior groove 216a are arranged in an alternative manner around the interior groove 216a and along the first and the second axial directions 81, 82 on the first surface 211a (i.e. the X-Y plane). Upon such an arrangement, upward extension of the second metal lead 2141a inside the interior groove 216a to the first surface 211a won't interfere or intersect any of the first metal leads 2131a embedded on the first surface 211a. Namely, on either the first surface 211a or the lateral surface of the substrate 21a, the first metal leads 2131a standing for the first circuit layout 213a and the second metal leads 2141a standing for the second circuit layout 214a can be alternatively arranged and embedded around the interior groove 216a so as to provide multiple contact points to electrically couple the foreign electronic or electric devices.

Figure 7:
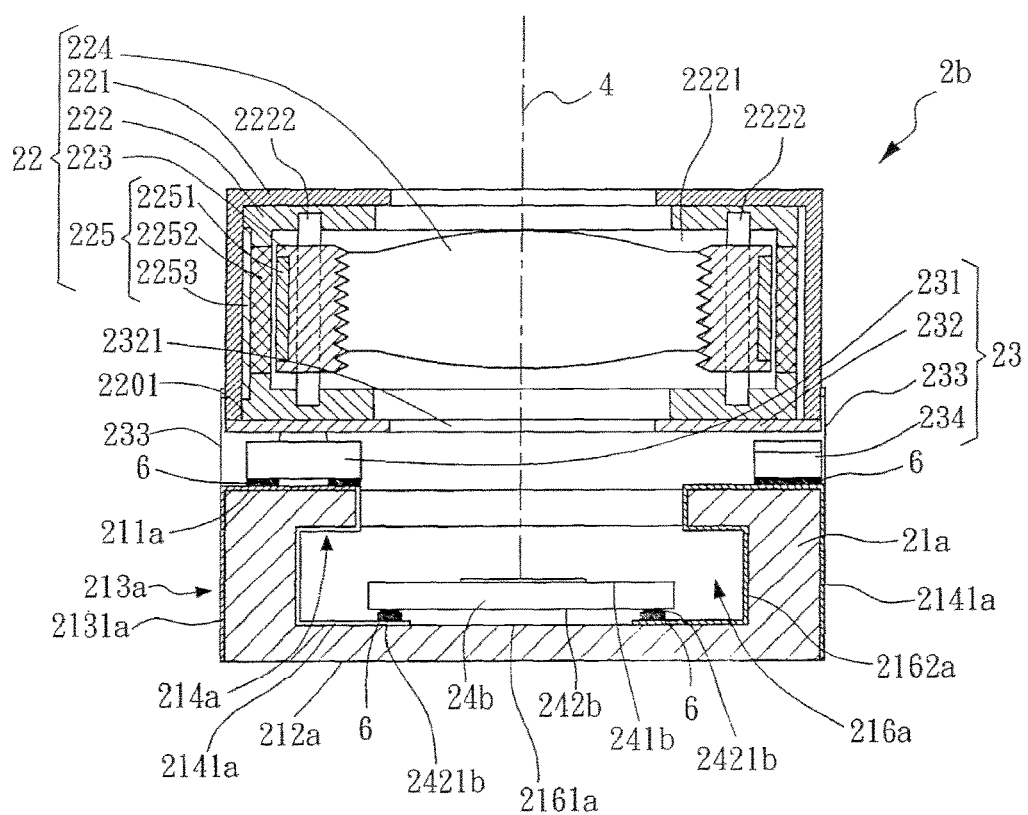
FIG. 7 is a schematic cross-sectional view of a third embodiment of the integrated substrate for an anti-shake apparatus in accordance with the present invention.

Referring now to FIG. 7, a cross-sectional view of the third embodiment of the integrated substrate for an anti-shake apparatus in accordance with the present invention is shown. The major difference between this third embodiment and the second embodiment of FIG. 5 is that the inactive side 242b of the image-sensing module 24b is attached to be mounted above the groove bottom surface 2161a of the interior groove 216a at a region that does appear portion of the second circuit layout 214a. On the other hand, the active side 241b of the image-sensing module 24b faces upward to the lens module 22 at the image-capturing optical axis 4.

Namely, plural contact points 2421b can be provided to the inactive side 242b of the image-sensing module 24b so as to connect electrically to the respective second metal leads 2141a of the second circuit layout 214a embedded on the groove bottom surface 2161a of the interior groove 216a via the appropriate conductive materials 6 (such as conductive glue, solders or solder balls). Upon such an arrangement, the image-sensing module 24b inside the interior groove 216 can obtain controls transmitted from the second metal leads 2141a so as to have the lens module 22 to perform image-capturing upon a foreign object.

Figure 8:
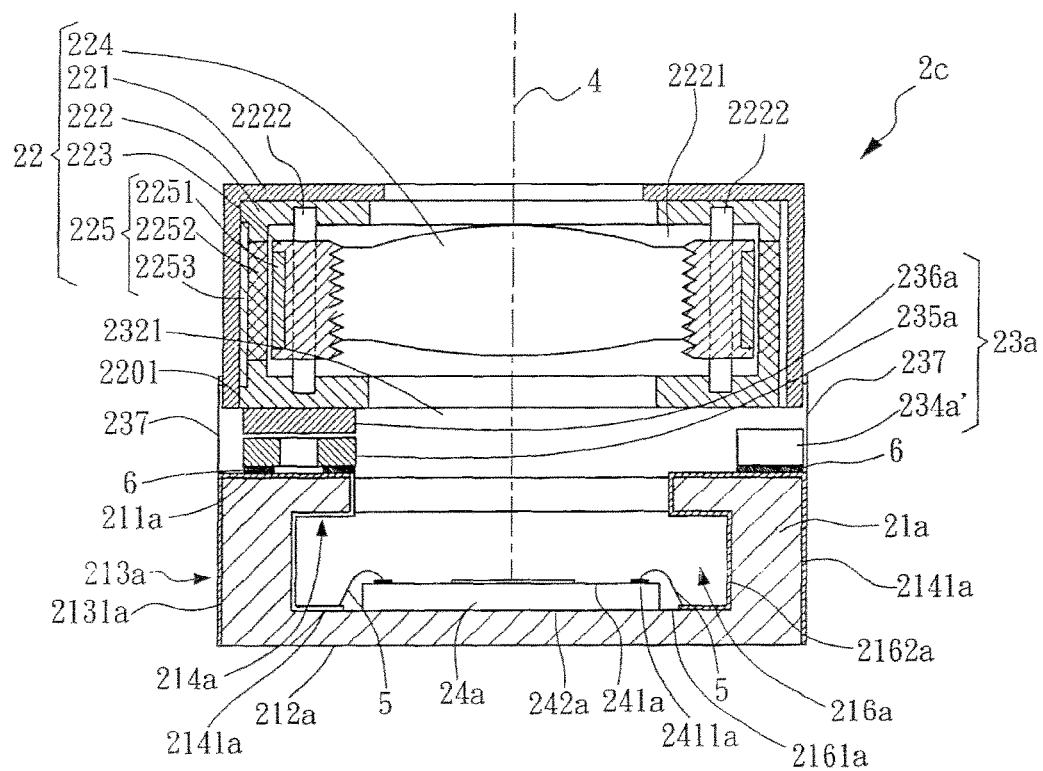
FIG. 8 is a schematic cross-sectional view of a fourth embodiment of the integrated substrate for an anti-shake apparatus in accordance with the present invention.
Figure 9:
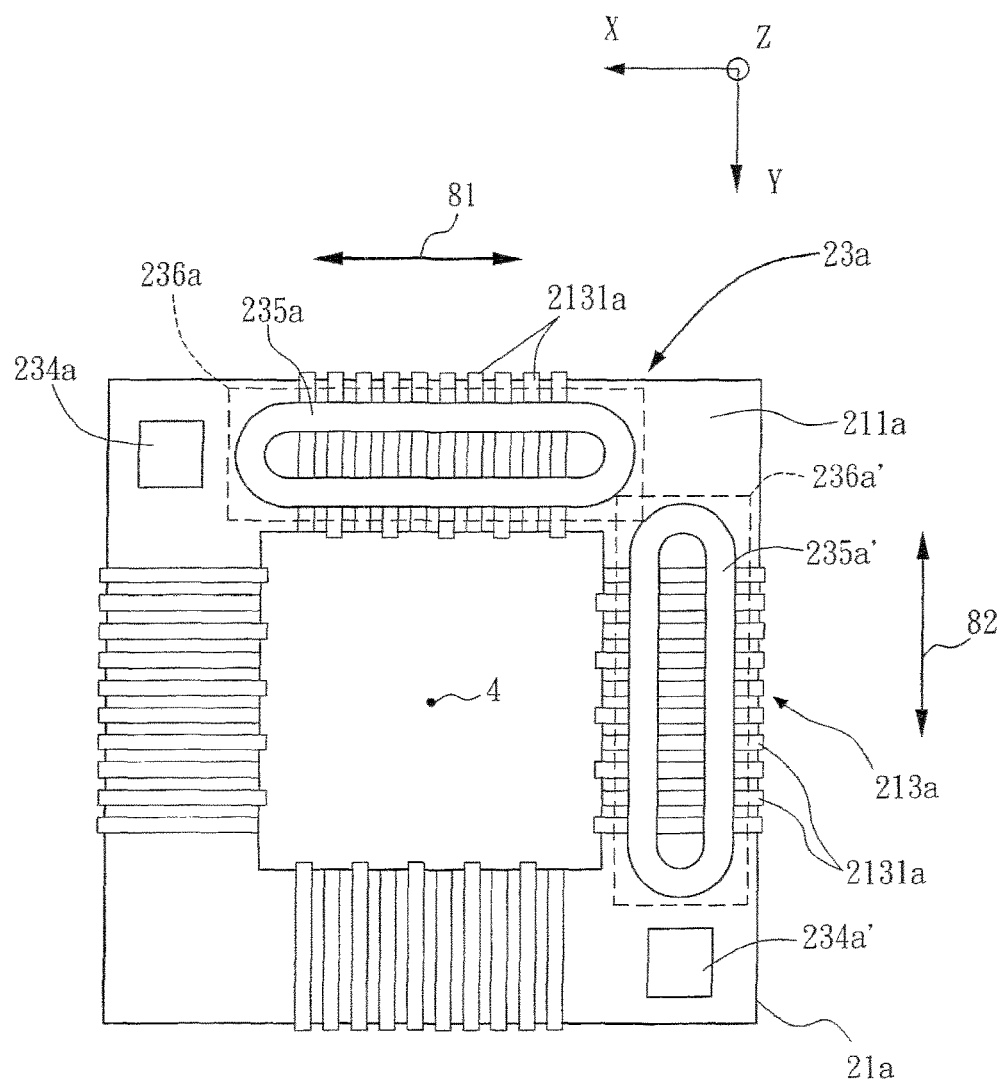
FIG. 9 is a top view of FIG. 8.

Referring now to FIG. 8 and FIG. 9, a cross-sectional view and a top view of the same fourth embodiment of the integrated substrate for an anti-shake apparatus in accordance with the present invention are shown, respectively. The major difference between this fourth embodiment and the second embodiment of FIG. 5 is that the anti-shake apparatus 23a of the integrated substrate 2c of this fourth embodiment can further includes at least two coils 235a, 235a', at least two magnets 236a, 236a" and a plurality of hanging wires 237. In the fourth embodiment, the hanging wires 237 are fixed to four lateral sides of the substrate 21a in a manner of parallel to the image-capturing optical axis 4 to suspend the lens module 22 above the substrate 21a. In the present invention, these hanging wires 237 are solid and straightly extended. The two coils 235a, 235a' separately mounted on the first surface 211a of the substrate 21a are connected electrically to the first metal leads 2131a of the first circuit layout 213a on the first surface 211a via the conductive materials 6 (conductive glue, solders or solder balls).

The two magnets 236a, 236a' are separately mounted on a bottom surface 2201 of the lens module 22 at positions corresponding to the respective coils 235a, 235a'. The two pairs of the coils 235a, 235a' and the magnets 236a, 236a' are to lie along the first axial direction 81 and the second axial direction 82, respectively. By providing different directions of the input currents to the coils 235a, 235a', the direction of the magnetic lines induced by the coils 235a, 235a' can also vary so as thereby to drive the lens module 22 having the magnets 236a, 236a' to move along the image-capturing optical axis 4 and thus to perform correction movements against the existing displacement biases of the lens module 22 with respect to the substrate 21a. As shown, the position-detecting modules 234a, 234a' are mounted to the respective predetermined positions on the first surface 211a of the substrate 21a and aside to the corresponding coils 235a, 235a'. The position-detecting modules 234a, 234a' are electrically connected to the first metal leads 2131a of the first circuit layout 213a via the conductive materials 6. By providing the position-detecting modules 234a, 234a', the displacement biases of the lens module 22 away from the image-capturing optical axis 4 in the first axial direction 81 and the second axial direction 82 can then be computed. Namely, through the direction changes of the input currents from the first metal lead 2131a, the magnetic lines induced by the coils 235a, 235a' would alter accordingly, and thus the lens module 22 having the magnets 236a, 236a' can then be move to compensate the displacement biases of the lens module 22 away from the image-capturing optical axis 4.

In summary, the integrated substrate 2 for an anti-shake apparatus in accordance with the present invention defined with an image-capturing optical axis 4 includes a substrate 21, a lens module 22, an anti-shake apparatus 23 and an image-sensing module 24. The substrate 21 further includes a frame with a predetermined thickness, in which the frame has a first surface 211, a second surface 212, a first circuit layout 213 and a second circuit layout 214. The first circuit layout 213 and the second circuit layout 214 further include a plurality of first metal leads 2131 and a plurality of second metal leads 2141, respectively.

The lens module 22 is located on the image-capturing axis 4 above the substrate 21. The anti-shake apparatus 23 is located between the lens module 22 and the substrate 21. The lens module 22 is suspended above the substrate 21 as well as the image-sensing module 24 by the anti-shake apparatus 23. The image-sensing module 24 further has an active side 241 and an inactive side 242, in which the inactive side 242 is located on the substrate 21 while the active side 241 is located on the optical axis 4 at a position facing the lens module 22. The anti-shake apparatus 23 is electrically connected with the substrate 21 through the first circuit layout 213, while the image-sensing module 24 is electrically connected with the substrate 21 through the second circuit layout 214.

By providing the first circuit layout 213 and the second circuit layout 214 to the first surface 211 and the second surface 212 of the substrate 21, respectively, so as to electrically connect with the anti-shake apparatus 23 and the image-sensing module 24, the components needed for the system can be reduced and also the manufacturing cost can be trimmed down. Further, possible manufacturing tolerance to bias the photo axis 4 by accumulated components' tolerances can be avoided. Thereby, yield and precision of the production can be substantially increased, and an overall miniaturization upon the integrated substrate 2 for an anti-shake apparatus can thus be successfully obtained.

While the present invention has been particularly shown and described with reference to a preferred embodiment, it will be understood by those skilled in the art that various changes in form and detail may be without departing from the spirit and scope of the present invention.

What is claimed is:

1. An integrated substrate, comprising: a substrate, furnished with a first circuit layout and a second circuit layout; a lens module, defining an image-capturing optical axis and located above the substrate; a driving module, located on the substrate for driving the lens module to move relative to the substrate: an image-sensing module, further having an active side and an inactive side opposite to said active side, wherein the image-sensing module is located on the substrate and the active side is located on the image-capturing optical axis at a position facing the lens module; and at least one position-detecting module, mounted on the substrate to detect displacement of the lens module relative to the substrate; wherein the at least one position-detecting module is electrically connected with the first circuit layout; the image-sensing module is attached to the substrate and is electrically connected with the second circuit layout, wherein the substrate has a first surface and a second surface opposite to said first surface; an interior groove is formed in a central empty portion of the substrate; the first circuit layout is connected with both the position-detecting module and the driving module: wherein the position-detecting module and at least a part of the driving module is directly attached on the first surface of the substrate: wherein the inactive side of the image-sensing module is attached to be mounted on a groove bottom surface of the interior groove, the active side of the image-sensing module faces upward to the lens module on the image-capturing optical axis, and the image-sensing module is electrically connected to the second circuit layout embedded inside the interior groove.

2. The integrated substrate according to claim 1, wherein the substrate has a first surface and a second surface opposite to said first surface; a penetration hole is located at a central portion of the substrate, a concave-down step structure is formed in a middle portion of the second surface, the first circuit layout is connected with both the position-detecting module and the driving module; wherein the position-detecting module and at least a part of the driving module are directly attached on the first surface of the substrate, while the image-sensing module is directly attached on the step structure of the second surface of the substrate.

3. The integrated substrate according to claim 2, wherein the first circuit layout is located on the first surface of the substrate, and the second circuit layout is located on the step structure of the second surface of the substrate to facilitate electric connections with the image-sensing module.

4. The integrated substrate according to claim 2, wherein the active side of the image-sensing module is mounted onto the concave step structure and the penetration hole of the second surface by a flip-chip technique, the active side of the image-sensing module is in a position respective to the lens module on the image-capturing optical axis, a plurality of conductive ends at an outer rim of the active side are electrically coupled with the second circuit layout exposed on the concave step structure via conductive materials, and the conductive material is one of conductive glue, a solder and a solder ball.

5. The integrated substrate according to claim 1, wherein the first circuit layout is extended from the first surface to a lateral surface of the substrate, and the second circuit layout inside the interior groove of the substrate is extended to the first surface and the lateral surface of the substrate.

6. The integrated substrate according to claim 1, wherein a plurality of conductive ends on the active side of the image-sensing module are electrically bridged individually by corresponding metal wires respectively to a plurality of second metal contacts of the second circuit layout embedded inside the interior groove.

7. The integrated substrate according to claim 1, wherein the inactive side of the image-sensing module is connected electrically to a plurality of second metal contacts of the second circuit layout embedded inside the interior groove via conductive materials, and the conductive material is one of conductive glue, a solder, a solder pad and a solder ball.

8. The integrated substrate according to claim 1, wherein the substrate is one of a glass substrate, a ceramic substrate and a printed circuit board, the lens module is one of a zooming lens module and an auto-focusing lens module, and the image-sensing module is one of a charge coupled device (CCD) and a complementary metal oxide semiconductor (CMOS).

9. The integrated substrate according to claim 1, wherein a first axial direction and a second axial direction perpendicular to said first axial direction are defined to a plane of the substrate perpendicular to the image-capturing optical axis, the driving module and the at least one position-detecting module are components of an anti-shake apparatus; wherein the anti-shake apparatus includes:
- a friction plate, located on a bottom surface of the lens module, having a penetration hole at a central portion thereof for allowing the image-capturing optical axis to pass and thereby for allowing the lens module to face the image-sensing module;
- at least one piezoelectric member, set on the first surface of the substrate and extending upward to contact the friction plate, wherein a voltage is applied to the at least one piezoelectric member so as to drive the lens module; wherein the piezoelectric member is the driving module;
- a plurality of spring members, located fixedly at four lateral sides of the substrate and extending to fix elastically the lens module over the substrate in a manner of parallel to the image-capturing optical axis; and
- said at least one position-detecting module, located on the first surface of the substrate for detecting displacement biases of the lens module away from the image-capturing optical axis.

10. The integrated substrate according to claim 9, wherein the at least one piezoelectric member includes two pairs of the piezoelectric members arranged on the substrate by a 90-degree angle to account for respective displacement biases at the first axial direction and the second axial direction, each of the piezoelectric members is formed as a piezoelectric motor, and each of the plurality of spring members is formed as one of a slender sinusoidal winding metal plate and a lengthwise spiral metal spring.

11. The integrated substrate according to claim 1, wherein a first axial direction and a second axial direction perpendicular to said first axial direction are defined to a plane of the substrate perpendicular to the image-capturing optical axis, the driving module and the at least one position-detecting module are components of an anti-shake apparatus; wherein the anti-shake apparatus includes:
- at least two coils, separately mounted on the first surface of the substrate;
- at least two magnets, separately mounted on a bottom surface of the lens module at positions corresponding to the respective coils; wherein the driving module is formed by combinations of the coils and the magnets;
- a plurality of hanging wires, fixed to four lateral sides of the substrate in a manner of parallel to the image-capturing optical axis to suspend the lens module above the substrate; and
- said at least one position-detecting module, mounted on the first surface of the substrate to detect displacement biases of the lens module away from the image-capturing optical axis;
- wherein the at least two coils and the at least two magnets form at least two pairs of the coils and the corresponding magnets aligned at least along the first axial direction and the second axial direction, and the lens module having the magnets is driven to compensate the displacement biases with respect to the image-capturing optical axis by varying directions of input currents to the coils so as to further alter directions of corresponding magnetic lines.

* * * * *